US009081380B2

(12) United States Patent
Eberhard

(10) Patent No.: US 9,081,380 B2
(45) Date of Patent: Jul. 14, 2015

(54) APPARATUS FOR DETERMINING AND/OR MONITORING A CHEMICAL OR PHYSICAL PROCESS VARIABLE IN AUTOMATION TECHNOLOGY

(75) Inventor: Holger Eberhard, Stuttgart (DE)

(73) Assignee: Endress + Hauser Conducta Gesellschaft für Mess-und Regeltechnik mbH + Co. KG, Dieselstr., Gerlingen (DE)

( * ) Notice: Subject to any disclaimer, the term of this patent is extended or adjusted under 35 U.S.C. 154(b) by 371 days.

(21) Appl. No.: 13/557,797

(22) Filed: Jul. 25, 2012

(65) Prior Publication Data
US 2013/0031285 A1  Jan. 31, 2013

Related U.S. Application Data

(60) Provisional application No. 61/511,598, filed on Jul. 26, 2011.

(30) Foreign Application Priority Data

Jul. 26, 2011 (DE) .......................... 10 2011 079 853

(51) Int. Cl.
G05B 19/41 (2006.01)
G05B 19/418 (2006.01)

(52) U.S. Cl.
CPC .................. G05B 19/4186 (2013.01)

(58) Field of Classification Search
CPC ........... G05B 2219/25428; G05B 2219/31121; G05B 2219/31132; G05B 19/0425
USPC .......................................................... 710/106
See application file for complete search history.

(56) References Cited

U.S. PATENT DOCUMENTS 7,188,200 B2 *  3/2007 Griech ......................... 710/100
7,830,798 B2 * 11/2010 Isenmann et al. ............. 370/231
(Continued)

FOREIGN PATENT DOCUMENTS

CN    1745731 A    3/2006
DE    19645626 A1  5/1998
(Continued)

OTHER PUBLICATIONS

Endress+Hauser—"Liquiline M CM 42 Operating Instructions"—48 Pages; No Date Provided; Retrieved Sep. 25, 2014.*

(Continued)

*Primary Examiner* — Brian Misiura
(74) *Attorney, Agent, or Firm* — Bacon & Thomas, PLLC

(57) ABSTRACT

An apparatus for determining and/or monitoring a chemical or physical, process variable in automation technology, comprising: a superordinated control unit; and a transmitter electronics having a first interface, a second interface and a third interface. The transmitter electronics communicates with the superordinated control unit by means of the first interface via a bus protocol. The transmitter electronics can be connected with a service unit via the second interface; and the third interface has a plurality of data channels for corresponding data source components; and wherein individual data channels are addressable and tunable via the service unit as a function of the connected data source components, so that data selected from the data for the connected data source components can be transmitted at the same time in at least one telegram to the superordinated control unit.

11 Claims, 2 Drawing Sheets

(56) References Cited

U.S. PATENT DOCUMENTS

| | | | |
|---|---|---|---|
| 8,798,930 B2* | 8/2014 | Wittmer et al. | 702/1 |
| 2009/0177970 A1* | 7/2009 | Jahl et al. | 715/735 |
| 2011/0251792 A1 | 10/2011 | Wittmer | |
| 2012/0182119 A1* | 7/2012 | Vetter et al. | 340/4.3 |
| 2013/0080585 A1* | 3/2013 | Schaffner et al. | 709/217 |

FOREIGN PATENT DOCUMENTS

| | | |
|---|---|---|
| DE | 29907909 U1 | 7/1999 |
| DE | 10349906 A1 | 5/2005 |
| DE | 102007039529 A1 | 2/2009 |
| DE | 102010016283 A1 | 10/2011 |
| WO | WO 2009024481 A1 * | 2/2009 |

OTHER PUBLICATIONS

German Search Report in corresponding German Application No. 10 2011 079 853.6, dated Feb. 1, 2012.

* cited by examiner

APPARATUS FOR DETERMINING AND/OR MONITORING A CHEMICAL OR PHYSICAL PROCESS VARIABLE IN AUTOMATION TECHNOLOGY

CROSS-REFERENCE TO RELATED APPLICATION

This application is a Nonprovisional application which claims the benefit of U.S. Patent Application 61/511,598, filed on Jul. 26, 2011.

TECHNICAL FIELD

The invention relates to an apparatus for determining and/or monitoring a chemical or physical process variable in automation technology.

BACKGROUND DISCUSSION

In automation technology, especially in process automation technology, field devices serving to register and/or influence process variables are often applied. For registering process variables, sensors, which are integrated, for example, in fill level measuring devices, flow measuring devices, pressure and temperature measuring devices, pH and redox potential measuring devices, conductivity measuring devices, etc., serve to register the corresponding process variables fill level, flow, pressure, temperature, pH value, or conductivity. Actuators serve for influencing process variables; such actuators can be, for example, valves or pumps, via which the flow of a liquid in a pipeline section or the fill level in a container can be changed. In principle, all devices, which are applied near to the process and deliver, or process, process relevant information, are referred to as field devices. In connection with the invention, remote I/Os, radio adapters, or, generally, electronic components, which are arranged on the field level, are understood to be field devices. Many such field devices are available from the Endress+Hauser group of firms.

In modern industrial plants, communication between at least one superordinated control unit and the field devices occurs, as a rule, via HART technology or a bus system, such as, for example, a Profibus® PA, Foundation Fieldbus®, etc., bus system. The bus systems can be embodied both wired as well as wirelessly. The superordinated control unit serves for process control, process visualization, process monitoring, process documentation, as well as for start up and operation of field devices and is also referred to as a configuration/management system. An operating tool, which runs independently on a superordinated unit, is available under the mark FIELDCARE from the Endress+Hauser group of companies.

Electronic device descriptions are usually applied for integrating field devices into a superordinated control unit. The electronic device descriptions enable the superordinated control unit to be able to detect and interpret data delivered by the field devices. In order that the field devices can be integrated into different fieldbus systems, device descriptions must be created for the different fieldbus systems. In addition to the electronic device descriptions, in increasing measure Device Type Managers (DTM) or device drivers according to the FDT standard are applied, which require a frame application, especially the FDT frame, as a runtime environment. Device drivers serve for comprehensive interaction with field devices.

A measurement transmitter is available under the mark LIQUILINE CM42 from the Endress+Hauser group of companies. Normally a single field device is connected to the measurement transmitter at the field or process level. In a special embodiment, the CM42 transmitter can also be operated with two connected field devices.

At the system level, the CM42 transmitter is connected with a superordinated control unit. In the known solution, the data which can be exchanged between the control unit and the transmitter electronics after the start up of the field device is specified in advance by the device firmware associated with the field device and the corresponding electronic device description or the corresponding device driver (DTM: Device Type Manager) stored in the superordinated control unit. A later change of this default situation is only possible when both the firmware as well as the corresponding electronic device description or the corresponding device driver are modified. The changes are relatively labor intensive and consume much time, and can usually only be performed by the device manufacturer. A flexible adaptation by the user at a later date is not possible.

SUMMARY OF THE INVENTION

An object of the invention is to provide an apparatus, which enables the user flexibly to adapt the data communicated between the transmitter electronics and the superordinated control unit to the current application.

The object is achieved by an apparatus comprising: a superordinated control unit; a transmitter electronics having a first interface, a second interface and a third interface; and a plurality of data source components, which exchange data with the transmitter electronics via a first bus system. The communication via the bus system preferably occurs using one of the customary bus protocols of automation technology. Of course, the data exchange can also occur using a proprietary bus protocol.

The data source components can be either hardware and/or software components. Typical hardware components are field devices, especially sensors or actuators, as well as relays, electrical current inputs/electrical current outputs, etc. Likewise the components named in the introduction of the description can also be subsumed under the term "field devices". The software components are especially mathematical relationship models. For example, a mathematical relationship model is the difference between the pH values provided by two pH sensors.

The transmitter electronics communicates with the superordinated control unit via the first interface using a second bus protocol. Of course, the first bus protocol and second bus protocol can be completely identical. If this is not the case, a gateway is provided to perform the protocol conversion.

Via the second interface, the transmitter electronics is connected, or can be connected, with a service unit. The service unit can be, for example, a PC, a laptop or other servicing tool, which can be connected to the transmitter electronics via a USB interface or a proprietary service interface (e.g. the so called CDI interface, which is provided on field devices produced by Endress+Hauser). Of course, the selection of the data to be communicated can also occur via a data carrier, such as, for instance, an SD card (Secure Digital Memory Card).

A plurality of data channels for corresponding data source components are associated with the third interface, wherein the individual data channels are addressable and tunable by the service unit depending on the connected data source components. Moreover, the data from the connected data source components are, in each case, transmitted at the same time to the superordinated control unit in at least one telegram.

The apparatus of the invention includes, in principle, a constellation of hardware and software components of any desired complexity. The data can be, for example, measured values, manipulated variables, status information, diagnostic data, calibration/parameter data, etc. In automation technology, it is not unusual when e.g. one sensor provides a very large number of data. Depending on the sensor type the number of data can be greater than 1000. However, these extensive data are not always relevant for the user in every case of application. Rather, it is often the case that just a few data are completely sufficient for the needs of a user. Moreover, if—as in the case of the apparatus of the invention—a plurality of sensors are connected to a transmitter electronics, then the number of data provided by the hardware and software components correspondingly multiply. The solution of the invention provides a way for how a manageable number of data can be selected application specifically from a large number of data in a simple manner. This selected number of data is so addressed in the transmitter electronics via a mapping logic that the data can be transmitted coherently and efficiently for the applied bus protocol—preferably in one telegram or a small number of telegrams—to the superordinated control unit.

The flexibility delivered by the apparatus of the invention is considerable. If, for example, at least one of the field devices is replaced at a later point in time by a field device of another type, the user can then on-site select the data to be communicated. It is seen as advantageous in relation to the invention that parametering is directly possible on the transmitter electronics using a menu driven selection. Changes to the software of the superordinated control unit are not required. Only the device description or the DTM for the new device must be provided to the superordinated control unit.

An advantageous embodiment of the apparatus of the invention provides that the at least one telegram transmitted to the superordinated control unit is constructed such that selected main and auxiliary variables of the individual data source components are simultaneously transmitted in the telegram to the superordinated control unit. In such case, the main and auxiliary variables are selected from the variety of data delivered by the data source components. As previously stated, the selection occurs via the service unit. The service unit is, for example, a PC, a laptop or any hand held service tool that can be connected to the transmitter electronics.

As mentioned above, one of the customary bus protocols used in automation technology, such as the HART, Profibus PA or Fieldbus Foundation protocol, preferably serves as a communication protocol between the transmitter electronics and the superordinated control unit. It is viewed to be especially advantageous in connection with the present invention when the ModBus protocol is applied as the protocol. Moreover, of course, any Internet based protocol can also be used in connection with the present invention.

In the following, specific reference is made to ModBus as the transmission protocol between the transmitter electronics and the superordinated control unit. The ModBus protocol is a communication protocol based on a master/slave, or client/server, architecture. In reference to the present case in the application of the ModBus protocol, the superordinated control unit acts as the ModBus client, while associated with the transmitter electronics is a ModBus server, which answers queries from the ModBus client.

Of course, the procedure is similar in the case of the application of other protocols, such as HART, Profibus PA or Fieldbus Foundation.

Preferably, the ModBus protocol is so embodied that it addresses the main and auxiliary variables of the individual data source components, which variables are provided by the ModBus server, in a linear address space, the ModBus register. Furthermore, a database or a data model, in which the data from the data source components are stored in a structured way, is associated with the transmitter electronics. Since a number of data source components are connected to the transmitter electronics, the database, thus, includes the data from a plurality of data source components, wherein the data from each data sources component, in turn, are composed of a plurality of individual data elements.

Moreover, it is provided that a signal processing capability is associated with the transmitter electronics, wherein data produced by the signal processing capability are stored in the data elements of the corresponding data source components.

If the data sources are at least partially actuators, then the signal processing capability is so embodied that it retrieves and processes data from the database and delivers manipulated variables to the data source components via an interface between the transmitter electronics and the data source components. The interface is arranged directed toward the process. The actuators are operated via the interface.

BRIEF DESCRIPTION OF THE DRAWINGS

The invention will now be explained in greater detail based on the appended drawing, the figures of which show as follow.

DETAILED DESCRIPTION IN CONJUNCTION WITH THE DRAWINGS

Figure 1:
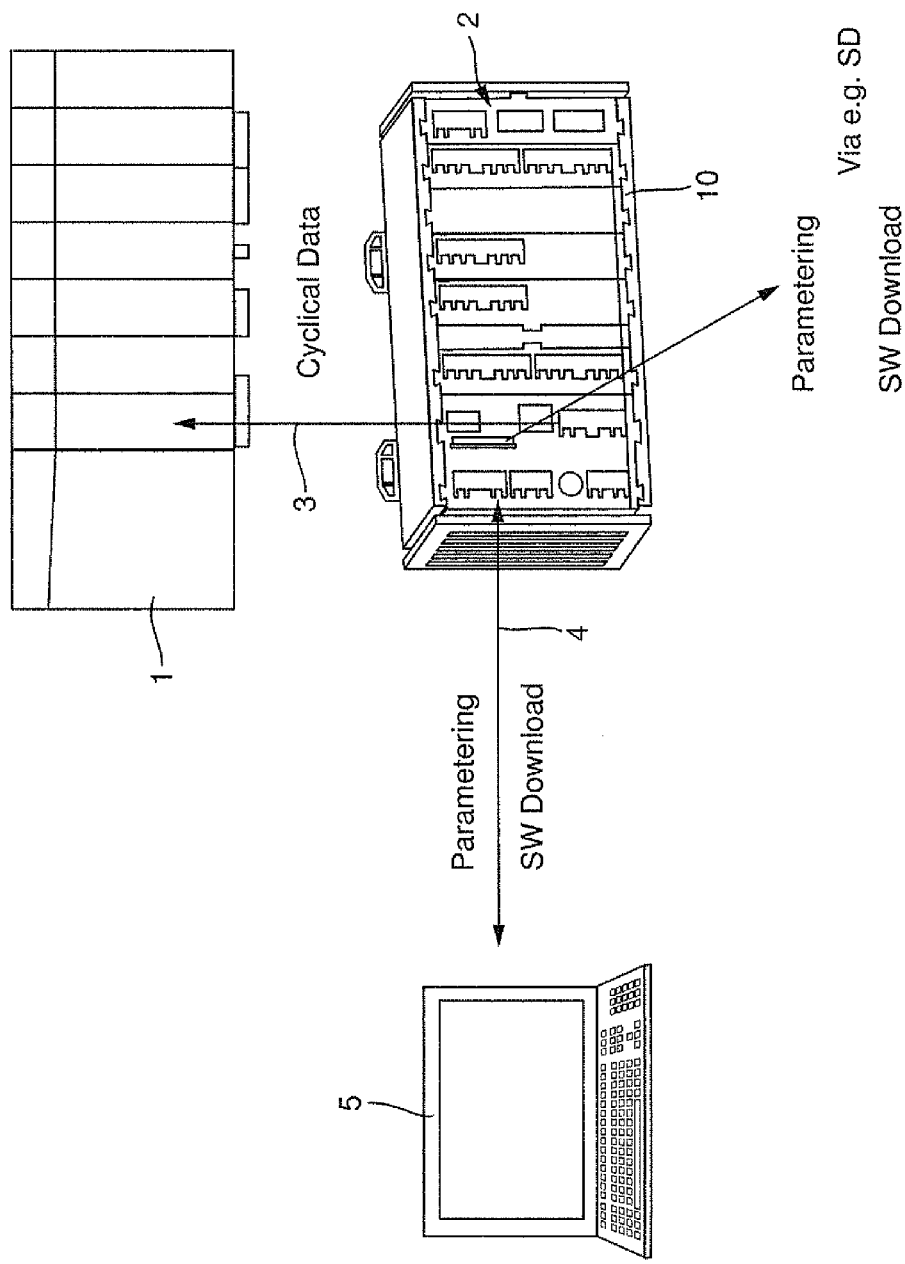
FIG. 1 a schematic representation of an embodiment of the apparatus of the invention.

FIG. 1 shows a schematic representation of an embodiment of the apparatus of the invention. The essential components of the apparatus of the invention are the superordinated control unit 1, the transmitter electronics 2 and the service unit 5, which is generally referred to as an HMI—Human Machine Interface. Transmitter electronics 2 and superordinated control unit 1 communicate with one another via a first interface 3. Communication between superordinated control unit 1 and transmitter electronics 2 occurs based on a bus protocol. Preferably used in connection with the invention is the ModBus protocol.

The superordinated control unit is, for example, a PLC (programmable logic control unit), a DCS (distributed control system) or a PCS (process control system). The field devices F1, F2, F3, F4, in connection with the solution of the invention, are designated as data sources and are those connected to transmitter electronics 2 via a multi-sensor or multi-actuator interface 8, or further field device interface.

Communication between service unit 5 and transmitter electronics 2 occurs via the interface 4. Alternatively, service unit 5 can be replaced by a data carrier, e.g. a SD card, in which information relative to the meaning of the selected data is already established.

Figure 2:
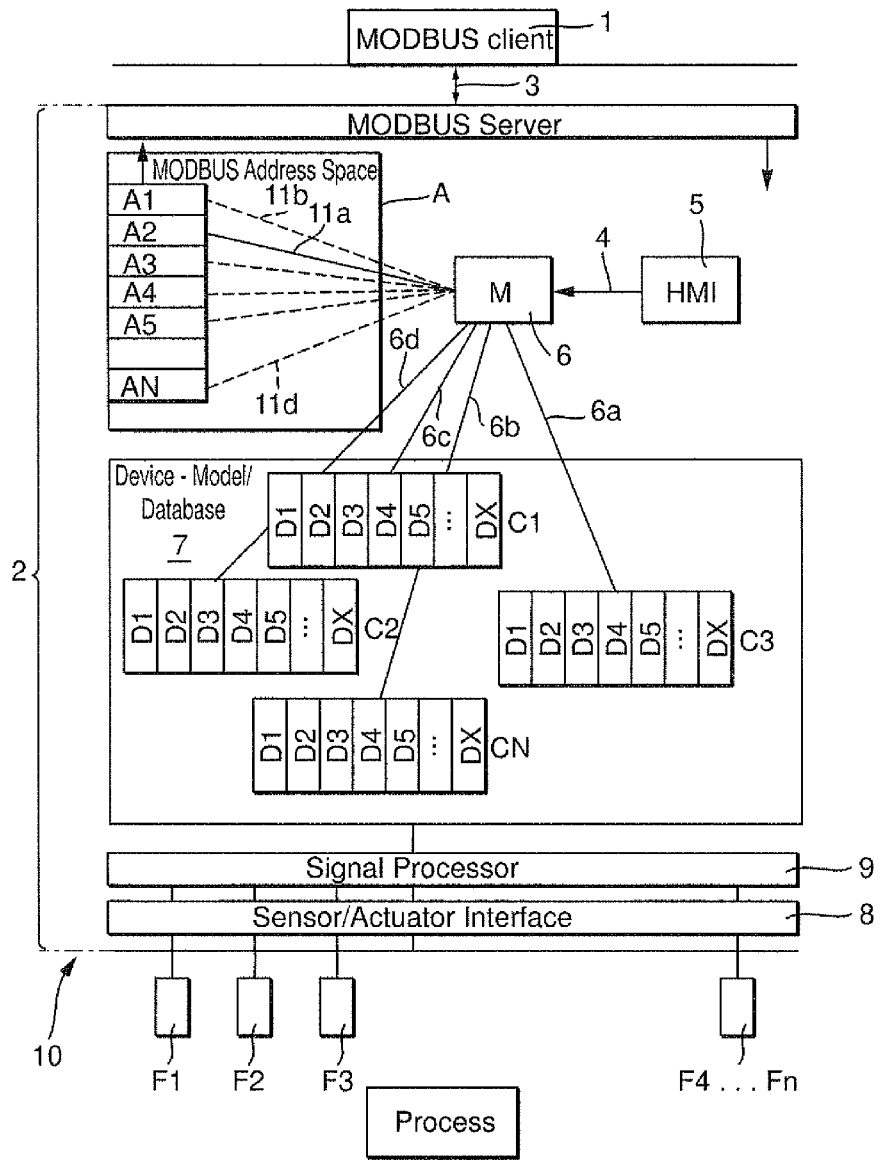
FIG. 2 a preferred embodiment of the apparatus of the invention.

FIG. 2 shows a preferred embodiment of the apparatus of the invention for determining and/or monitoring a chemical or physical, process variable in automation technology. The apparatus comprises superordinated control unit 1, transmitter electronics 2, which is arranged in a housing 10, and a number of field devices F1, F2 . . . Fn, which can be connected to transmitter electronics 2 via multi-sensor/actuator interface 8. Field devices F1, F2 . . . Fn are arranged in the process. The process is, for example, the activation basin of a clarification plant.

Transmitter electronics 2, which is arranged in housing 10, communicates via a first interface 3 with the superordinated control unit 1 using a bus protocol. In the illustrated case, the bus protocol is the ModBus protocol. Transmitter electronics 2 is connected to service unit 5 via second interface 4 in the case shown. In an alternative embodiment service unit 5 can be replaced by a data carrier. A number of data channels for the corresponding data source components F1, F2, F3 Fn are connected to transmitter electronics 2 via the third interface 6.

According to the invention, the individual data channels are addressed and set by service unit 5, or by the associating information stored on the data carrier, as a function of the connected data source components F1, F2, F3 . . . Fn. The addressing and setting occurs in such a manner that the data elements D1, D2 . . . DX selected from data C1, C2 . . . Cn of the respectively connected data source components F1, F2, F3 . . . Fn can be transmitted at the same time to superordinated control unit 1 in at least one telegram. As mentioned earlier, the data source components F1, F2, F3 . . . Fn are hardware and/or software components. The hardware components are especially field devices F1, F2 . . . Fn such as sensors, actuators, relays or electrical current inputs/electrical current outputs. The software components are preferably mathematical relationship models between the measurement data of the individual field devices F1, F2 . . . Fn. Also, in connection with the solution of the invention, field devices, which operate based on the Memosens technology of the assignee, are preferably applied.

In connection with the invention, each telegram is so constructed that selected main and/or auxiliary variables of the individual data source components F1, F2, F3 . . . Fn are transmitted at the same time in the telegram to superordinated control unit 1. In such case, the transmitted main and auxiliary variables are selected from the plurality of data C1, C2 . . . Cn delivered by the data source components F1, F2, F3 . . . Fn).

In detail, FIG. 2 shows as follows. Superordinated control unit 1 represents the ModBus client, which sends data to the ModBus server 2, i.e. transmitter electronics 2, using the ModBus protocol, or retrieves data from ModBus server 2. Using the standard ModBus Command (or function code) No. 23, the two data directions can be replaced by one transaction composed of a request telegram of the ModBus client 1 and the associated ModBus reply telegram of the ModBus server 2. ModBus server 2, which is preferably integrated in a separate transmitter housing 10, answers the queries of the ModBus client 1.

In the ModBus protocol, the data of ModBus server 2 are addressed in a linear address space A. The data of the data source F1, F2 . . . Fn are so arranged in the ModBus address space A that interrelated data can be contiguously addressed from an application point of view. This means, for example, that the main and/or auxiliary variables, such as measured values or status information, which ModBus server 2 provides, are associated with addresses A1 . . . An following one after the other and can, thus, be retrieved by ModBus client 1 with one or very few queries.

The data C1, C2 . . . Cn delivered by data sources F1, F2 . . . Fn, i.e. the field devices, are stored in a structured way in a kind of database 7 in the transmitter electronics. Database 7, respectively the data model, comprises data C1, C2 . . . Cn associated with each of the individual data sources F1, F2 . . . F3. Each data set C1, C2 . . . C3 has a plurality of individual data elements D1, D2 . . . Dx.

The core component of transmitter electronics 2 is the mapping logic M between data elements D1, D2 . . . Dx of the data model, respectively the database 7, and ModBus address space A. Mapping logic M can be defined in two steps:
1. Selecting the data components F1, F2 . . . Fn.
2. Selecting the data element D1, D2 . . . Dx from the data set C1, C2, . . . Cn associated with the selected data component F1, F2 . . . Fn.

The invention claimed is:

1. An apparatus for determining and/or monitoring a chemical or physical process variable in automation technology, said apparatus comprising:
   a superordinated control unit;
   a transmitter electronics having a first interface, a second interface and a third interface; and
   a service unit, wherein:
   said transmitter electronics communicates with said superordinated control unit by means of said first interface via a bus protocol;
   said transmitter electronics can be connected with said service unit via said second interface;
   said third interface has a plurality of data channels for corresponding data source components; and
   individual data channels are addressable and tunable via said service unit as a function of said connected data source components, so that data selected from data for said connected data source components can be transmitted at the same time in at least one telegram to said superordinated control unit,
   said data source components are hardware and/or software components, and
   said software components are mathematical relationship models.

2. The apparatus as claimed in claim 1, wherein:
   said hardware components are field devices.

3. The apparatus as claimed in claim 1, wherein:
   the bus protocol is, one of: the HART protocol, the Profibus PA protocol or the Fieldbus Foundation protocol.

4. The apparatus as claimed in claim 1, wherein:
   said hardware components are sensors, actuators, relays or electrical current inputs/electrical current outputs.

5. An apparatus for determining and or monitoring a chemical or physical process variable in automation technology, said apparatus comprising:
   a superordinated control unit;
   a transmitter electronics having a first interface, a second interface and a third interface; and
   a service unit, wherein
   said transmitter electronics: communicates with said superordinated control unit by means of said first interface via a bus protocol;
   said transmitter electronics can be connected with said service unit via said second interface;
   said third interface has a plurality of data channels for corresponding data source components;
   individual data channels are addressable and tunable via said service unit as a function of said connected data source components, so that data selected from data for said connected data source components can be transmitted at the same time in at least one telegram to said superordinated conrol unit;
   said telegram is so constructed that selected main and/or auxiliary variables of the individual data source components are transmitted at the same time in the telegram to said superordinated control unit; and said main and auxiliary variables are selected from the plurality of data, which are delivered from said data source components.

6. An apparatus for determining and/or monitoring a chemical or physical process variable in an automation technology, said apparatus comprising:
- a superordinated control unit;
- a transmitter electronics having a first interface, a second interface and a third interface; and
- a service unit, wherein:
- said transmitter electronics communicates with said superordinated control unit by means of said first interface via bus protocol;
- said transmitter electronics can be connected with said service unit via said second interface;
- said third interface has a plurality of data channels for corresponding data source components;
- individual data channels are addressable and tunable via said service unit as a function of said connected data source components, so that data selected from data for said connected data source components can be transmitted at the same time in at least one telegram to said superordinated control unit;
- the bus protocol is the ModBus protocol;
- said superordinated control unit acts as a ModBus client; and
- a ModBus server, which answers queries from said ModBus client, is associated with said transmitter electronics.

7. The apparatus as claimed in claim 6, wherein:
said ModBus protocol is so embodied that it addresses in a linear address space, a ModBus register, the selected main and auxiliary variables of the data of said individual data source components, which the ModBus server provides.

8. An apparatus for determining and/or monitoring a chemical or physical process variable in automation technology, said apparatus comprising:
- a superordinated control unit;
- a transmitter electronics having a first interface, a second interface and a third interface; and
- a service unit, wherein:
- said transmitter electronics communicates with said superordinated control unit by means of said first interface via a bus protocol;
- said transmitter electronics can be connected with said service unit via said second interface;
- said third interface has a plurality of data channels for corresponding data source components;
- individual data channels are addressable and tunable vis said service unit as a function of said connected data source components, so that data selected from data for said connected data source components can be transmitted at the same time in at least one telegram to said superordinated unit;
- associated with said transmitter electronics is a database, in which the data of said data source components are stored;
- said database includes the data of a plurality of said data source components; and
- the data set of a data source component comprises a plurality of data elements.

9. The apparatus as claimed in claim 8, wherein:
- a signal processing capability is associated with said transmitter electronics; and
- data produced by said signal processing capability are stored in the data elements of said corresponding data source components.

10. The apparatus as claimed in claim 9, wherein:
said signal processing capability is so embodied that it retrieves and processes data from said database and delivers manipulated variables to a further field device interface.

11. The apparatus as claimed in claim 10, wherein:
said field devices are operated via said further field devices interface.

* * * * *